(12) United States Patent
Jiang et al.

(10) Patent No.: US 8,206,582 B2
(45) Date of Patent: Jun. 26, 2012

(54) SHAKING DEVICE FOR FILTER PLATES OF FILTER PRESS

(76) Inventors: Guiting Jiang, Jing County (CN); Baochang Liu, Jing County (CN)

( * ) Notice: Subject to any disclaimer, the term of this patent is extended or adjusted under 35 U.S.C. 154(b) by 0 days.

(21) Appl. No.: 13/345,668

(22) Filed: Jan. 7, 2012

(65) Prior Publication Data
US 2012/0103889 A1  May 3, 2012

Related U.S. Application Data

(63) Continuation of application No. PCT/CN2010/000819, filed on Jun. 10, 2010.

(51) Int. Cl.
- B01D 25/00 (2006.01)
- B01D 25/12 (2006.01)
- B01D 25/127 (2006.01)
- B01D 25/32 (2006.01)
- B01D 25/34 (2006.01)
- B01D 25/38 (2006.01)

(52) U.S. Cl. ........ 210/225; 210/224; 210/227; 210/230; 210/231; 210/785; 210/796

(58) Field of Classification Search ........... 210/224–231
See application file for complete search history.

(56) References Cited

U.S. PATENT DOCUMENTS

| | | | | |
|---|---|---|---|---|
| 4,209,404 A | * | 6/1980 | Yoshida | 210/225 |
| 4,710,293 A | * | 12/1987 | Davis | 210/225 |
| 5,167,801 A | * | 12/1992 | Kawasaki | 210/106 |
| 5,855,778 A | * | 1/1999 | Hutchison et al. | 210/225 |

* cited by examiner

*Primary Examiner* — Benjamin Kurtz
(74) *Attorney, Agent, or Firm* — Matthias Scholl P.C.; Matthias Scholl

(57) ABSTRACT

A shaking device for filter plates of a filter press including a fixed support, a movable frame, a sleeve spring device, and a shaking rod. The fixed support includes a main beam and a support crossbeam. The movable frame includes a frame crossbeam and a vertical beam. The movable frame is disposed on the support crossbeam. One end of the sleeve spring device is attached to the frame crossbeam and the other end is attached to the shaking rod. The movable frame is driven by a gear motor. The shaking device further includes a cylinder assembly. The cylinder assembly is coaxially connected with the sleeve spring device and the shaking rod in a straight line. When the cylinder assembly acts on the shaking rod, the shaking rod shakes to separate and shakes a plurality of filter cloth rods of the filter plates to remove the filter cakes.

5 Claims, 6 Drawing Sheets

SHAKING DEVICE FOR FILTER PLATES OF FILTER PRESS

CROSS-REFERENCE TO RELATED APPLICATIONS

This application is a continuation of International Patent Application No. PCT/CN2010/000819 with an international filing date of Jun. 10, 2010, designating the United States, now pending, and further claims priority benefits to Chinese Patent Application No. 200910158333.6 filed Jul. 7, 2009. The contents of all of the aforementioned applications, including any intervening amendments thereto, are incorporated herein by reference.

BACKGROUND OF THE INVENTION

1. Field of the Invention

The invention relates to a shaking device for filter plates of a filter press, which is used to separate filter plates in batches to remove filter cakes.

2. Description of the Related Art

Filter presses are regarded as the main filtration equipment in the solid-liquid separation industry. To complete a filter cycle, liquid-solid slurries are first filtered to leave the filter cakes in the filter chambers formed by the filter plates, and then the automatic shifting device operates to separate the filter plates to remove the filter cakes. In the prior art, a filter press has a large filtration area and a plurality of filter plates, and thus it takes a long time to separate the filter plates individually. To improve the production efficiency, a method for removal of the filter cakes has been developed by separating the filter plates in batches.

However, the foregoing method still has disadvantages. In the filtration industry, because different filter cakes contains different components, some contain microparticles and some are adhesive, they cannot automatically fall off after the filter plates are separated in batches. If the removal work is conducted manually, it inevitably leads to low efficiency, slow removal speed, and high labor intensity. Meanwhile, the filter cloth is likely to be damaged. All of these increases the production costs and decreases the filter efficiency, which in turn affects the production. Consequently, difficulties arise when the filter cakes are removed by separating the filter plates in batches.

SUMMARY OF THE INVENTION

In view of the above-described problems, it is one objective of the invention to provide a shaking device for filter plates of a filter press.

To achieve the above objective, in accordance with one embodiment of the invention, there is provided a shaking device for filter plates of a filter press, comprising a fixed support, a movable frame, and a sleeve spring device, wherein the fixed support comprises a main beam and a support crossbeam; the movable frame comprises a frame crossbeam and a vertical beam; the movable frame is disposed on the support crossbeam; one end of the sleeve spring device is attached to the frame crossbeam and the other end is attached to a shaking rod; the movable frame is driven by a gear motor comprising a gear box, and the gear box of the gear motor is disposed with a symmetrical drive shaft; a limiting device is disposed on the movable frame to control the move thereof; one side of the main beam of the fixed support is provided with a chain stand, on which a chain is disposed; on the chain is disposed with a main air pipe, and one end of the main air pipe is connected with an air supply joint and the other end is connected with an air diverting valve; the air diverting valve is connected with a cylinder assembly and a three-way air connector in turn via an air subpipe; the cylinder assembly is coaxially connected with the sleeve spring device and the shaking rod in a straight line; the fixed support is disposed on the upper end of the filter press via support legs; a front support leg is attached to a thrust plate of the filter press and a rear support leg is attached to an oil cylinder seat.

In a class of this embodiment, one end of the drive shaft is disposed with a pulley and a gear for the operation of the movable frame, and the gear fits with a gear rack that is located on the upper end surface of the main beam.

In a class of this embodiment, the sleeve spring device comprises a sleeve body, a sleeve spring, and a sleeve shaft; the lower end of the sleeve body is fixed with a sleeve base plate and the sleeve base plate is fixedly connected with the shaking rod; the lower end of the sleeve shaft is disposed with a flange that is attached to the sleeve spring and the other end of the flange is attached to the shaking rod; the upper end of the sleeve shaft is fixed on the lower base plate of a sleeve hanger plate and the sleeve hanger plate is connected with the frame crossbeam.

In a class of this embodiment, the cylinder assembly is disposed under the frame crossbeam.

In a class of this embodiment, the three-way air connector is disposed on the vertical beam of the movable frame. The pulley is disposed on the upper end of the movable frame, and a movable wheel is disposed on the lower end of the frame crossbeam.

The shaking device for filter plates of a filter press provided by the invention is disposed on the upper end of the press filter and the shaking device is controlled by a PLC (Programmable Logic Controller) program.

Advantages of the invention are summarized below: After the first group of the filter plates are separated, the moveable frame moves to the shaking position via the gear driven by the gear motor and then stops automatically by electrically controlled proximity switches that are disposed on the filter plates. Afterwards, the air diverting valve opens to allow the cylinder to act on the shaking rod via the three-way air connector and the times of shaking is controlled. When the shaking action is completed, the shaking rod automatically retracts from the sleeve spring device. The filter cakes on the filter cloth drop off automatically while the filter cloth rods are shaken by the shaking rod. The second group of the filter plates are separated after the first shaking is completed. Once all the shaking actions are finished in turn, the electrically controlled limiting device disposed at the end of the filter press functions to allow the movable frame to move back to its original position. Such a process comprising the shaking times and moving route is controlled by a PLC program. It is simple, accurate, rapid, and convenient. In summary, the shaking device for filter plates provided by the invention has a simple structure and is easy to be operated, and meanwhile the filter cakes can be effectively removed and the filter cloth can keep sufficient air permeability. The whole process is fully controlled automatically. The problem that the filter cakes fail to drop off automatically after the filter plates are separated has been solved, the desired effects are achieved, and the production efficiency is improved. Moreover, manual removal work is not required during the whole process, therefore labor intensity is reduced, and the filter cloth is unlikely to be damaged. It not only saves the costs but achieves excellent filtration effects.

Figure 1:
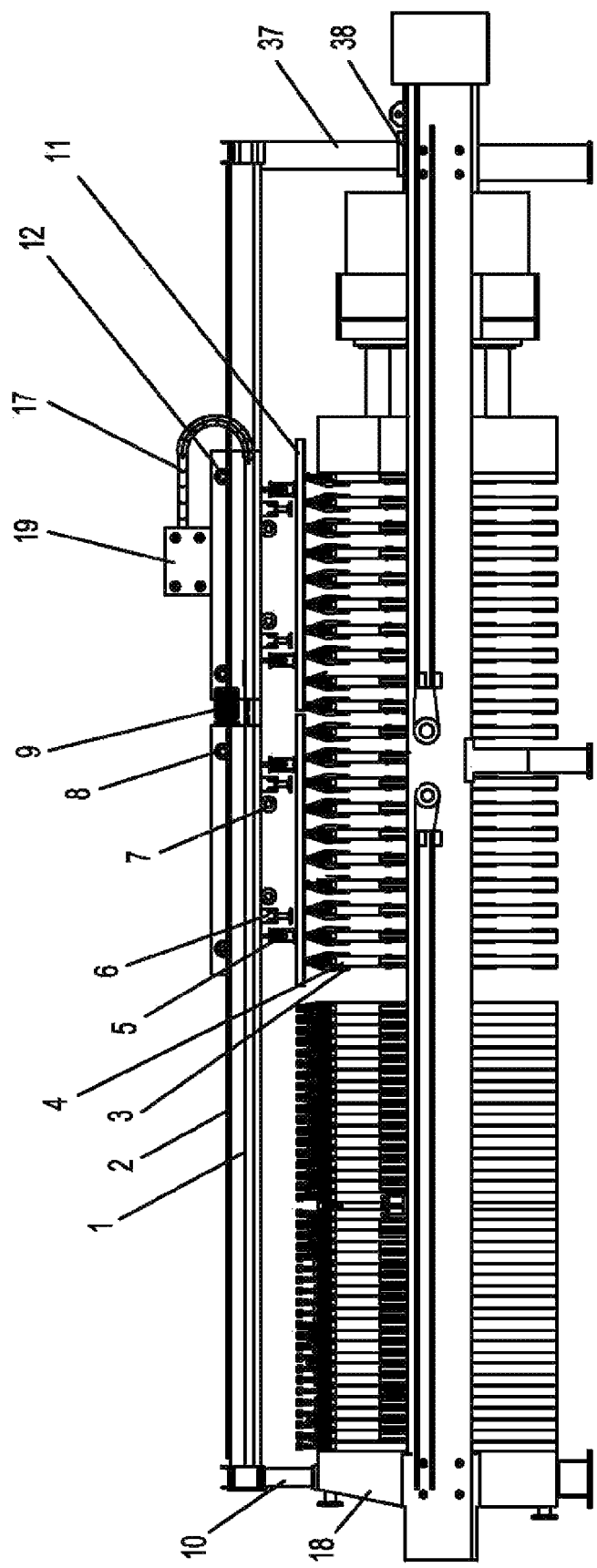
FIG. 1 is a schematic diagram of a shaking device for filter plates of a filter press in accordance with one embodiment of the invention.

In the drawings, the following reference numbers are used: main beam 1, gear rack 2, filter cloth 3, filter plate 4, sleeve spring device 5, cylinder assembly 6, movable wheel 7, gear 8, gear motor 9, front support leg 10, shaking rod 11, pulley 12, three-way air connector 13, drive shaft 14, vertical beam 15, movable frame crossbeam 16, chain 17, thrust plate 18, air diverting valve 19, main air pipe 20, air subpipe 21, air supply joint 22, support leg 23, support crossbeam 24, spring support 25, filter cloth spring 26, filter cloth rod 27, spring shaft 28, cover of filter cloth rod 29, sleeve body 30, sleeve shaft 31, sleeve hanger plate 32, sleeve base plate 33, sleeve spring 34, flange 35, nut 36, rear support leg 37, oil cylinder seat 38.

DETAILED DESCRIPTION OF THE EMBODIMENTS

The invention is explained in further detail below with reference to the attached drawings.

Figure 2:
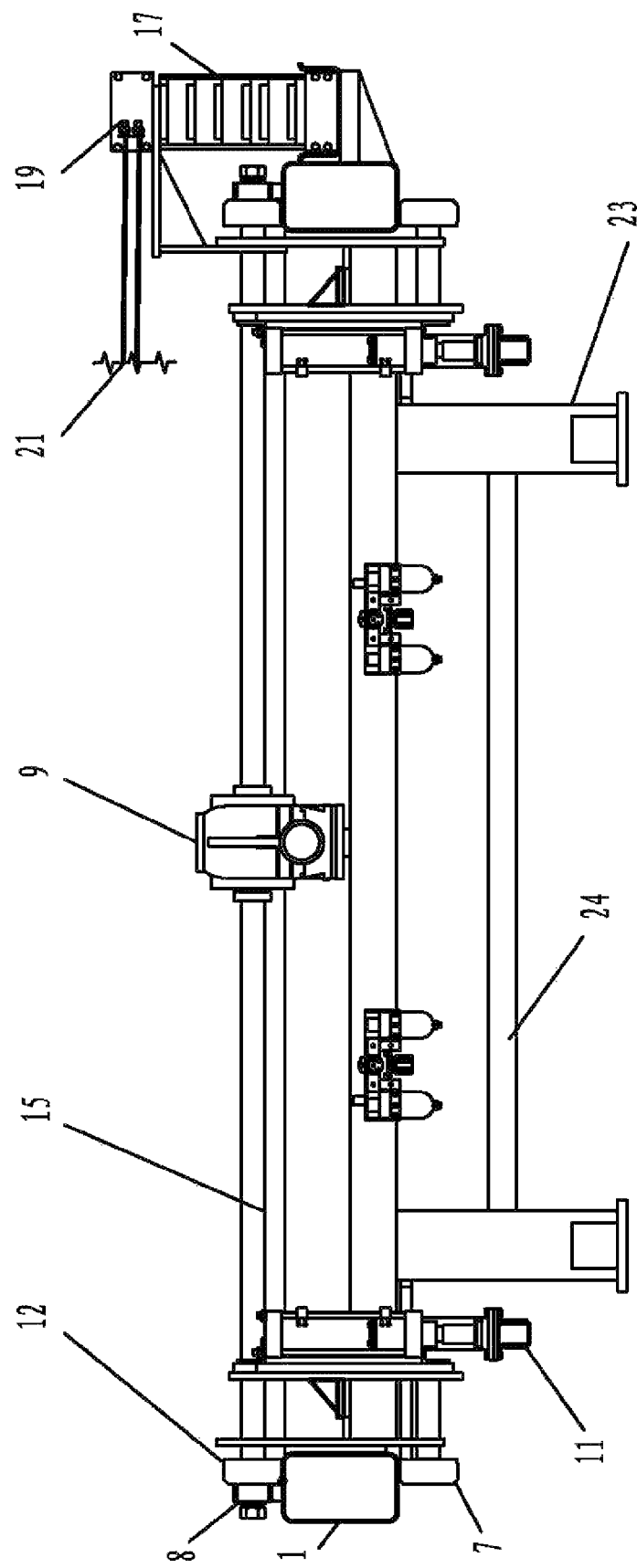
FIG. 2 is a side view of FIG. 1.
Figure 3:
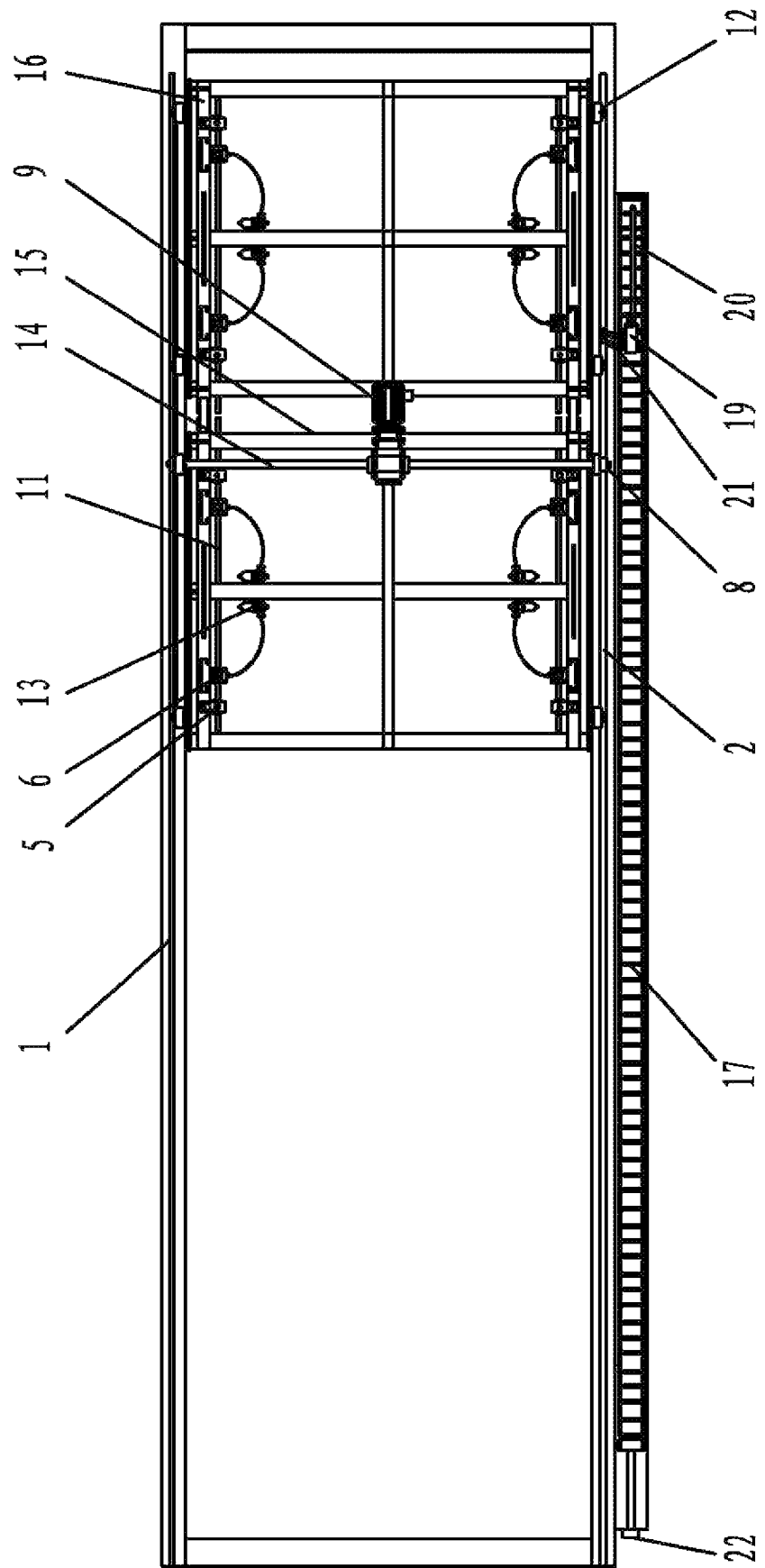
FIG. 3 is a top view of FIG. 1.

As shown in FIGS. 1, 2, and 3, a shaking device for filter plates of a filter press comprises a fixed support, a movable frame, and a sleeve spring device 5. The fixed support comprises a main beam 1 and a support crossbeam 24. The main beam 1 and the support crossbeam 24 are made of Q235 (Q235 represents an ordinary carbon steel with a yield value of about 235 MPa) welded rectangular tubes. One end of the sleeve spring device is attached to a frame crossbeam 16 of the movable frame and the other end is attached to a shaking rod 11. On the support crossbeam 24 is disposed with the movable frame. The movable frame comprises the frame crossbeam 16 and a vertical beam 15, which are made of Q235 welded channel steels. A limiting device is disposed on the movable frame.

The movable frame is driven by a gear motor 9, which is disposed on the vertical beam 15 of the movable frame. A gear box of the gear motor is disposed with a symmetrical drive shaft 14. The drive shaft 14 is located in a bore of the gear motor 9 and the other end of the drive shaft 14 is disposed with a pulley 12 and a gear 8 for the operation of the movable frame. The gear fits with a gear rack 2 that is arranged on the upper end surface of the main beam 1. The pulley 12 is disposed on the upper end of the movable frame. On the lower end of the frame crossbeam 16 is disposed with a movable wheel 7, which are used for positioning when the movable frame is in back-and-forth movement. The movable wheel 7 is provided with a wheel carrier.

One side of the main beam 1 of the fixed support is provided with a chain stand, on which a chain 17 is disposed. The chain serves as a support for an air pipe, which is disposed on the chain and moves with the movable frame.

On the chain is disposed with a main air pipe 20, and one end thereof is connected with an air supply joint 22 and the other end thereof is connected with an air diverting valve 19. The air diverting valve 19 comprises a welded base support that is connected with the frame crossbeam 16. The air diverting valve 19 is connected with a cylinder assembly 6 and a three-way air connector 13 in turn via an air subpipe 21. The three-way air connector 13 is disposed on the vertical beam 15 of the movable frame and the cylinder assembly 6 is disposed under the frame crossbeam.

The cylinder assembly 6 is coaxially connected with the sleeve spring device 5 and the shaking rod 11 in a straight line. The fixed support is disposed on the upper end of the filter press via support legs. A front support leg 10 is attached to a thrust plate 18 of the filter press and a rear support leg 37 is attached to an oil cylinder seat 38.

Figure 6:
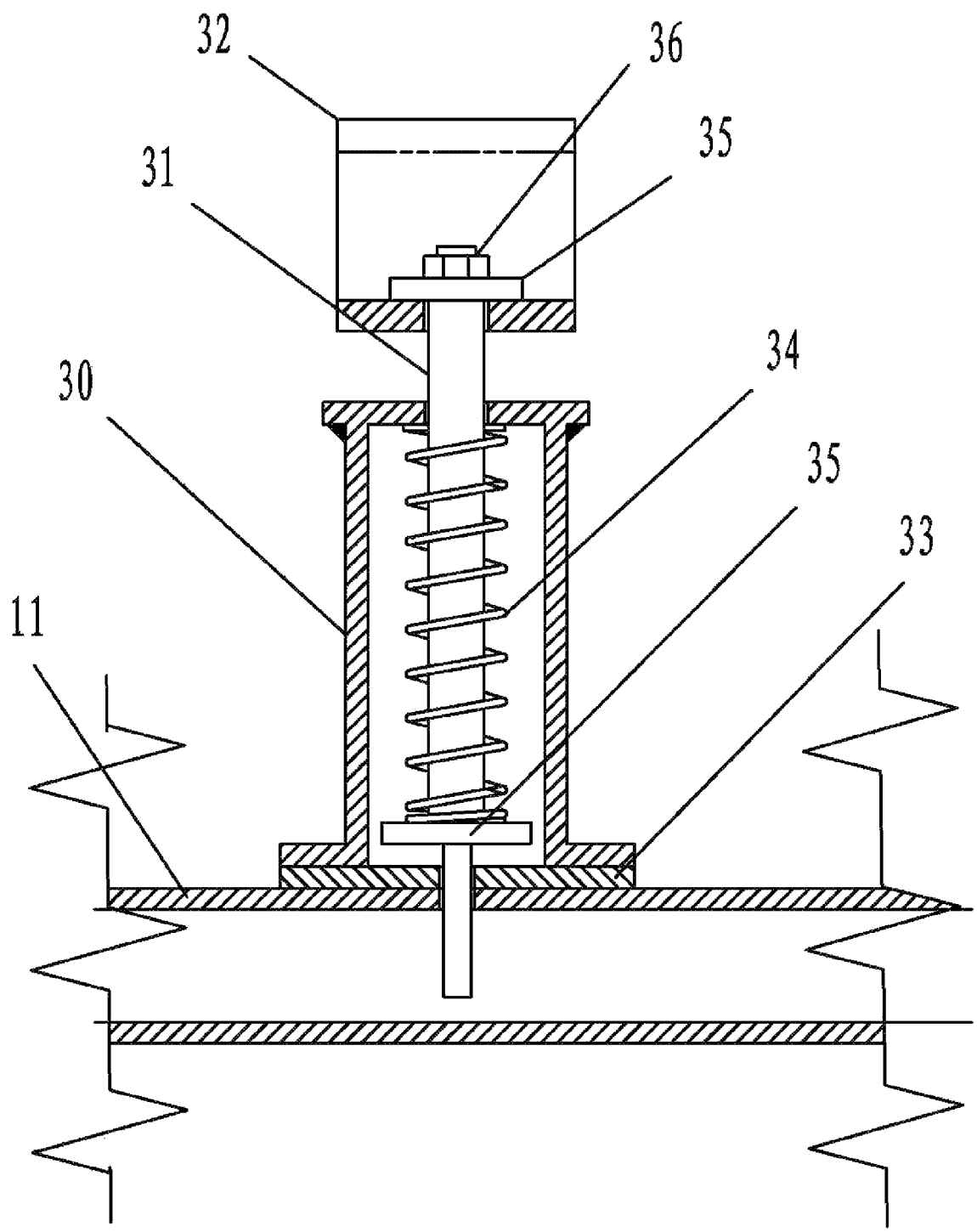
FIG. 6 is a schematic diagram of a sleeve spring device in accordance with one embodiment of the invention.

As shown in FIG. 6, the sleeve spring device 5 comprises a sleeve body 30, a sleeve spring 34, and a sleeve shaft 31. At the lower end of the sleeve body 30 is fixed with a sleeve base plate 33 and the sleeve base plate 33 is welded on the shaking rod 11. The lower end of the sleeve shaft 31 is disposed with a flange 35 that is attached to the sleeve spring 34 and the other end of the flange 35 is attached to the shaking rod 11. The upper end of the sleeve shaft 31 is fixed on the lower base plate of a sleeve hanger plate 32. Specifically, the upper end of the sleeve shaft 31 is disposed with a screw thread and a flange 35, which are fastened on the lower base plate of the sleeve hanger plate 32 via a nut 36. The sleeve hanger plate 32 is connected with the frame crossbeam 16 via a bolt. The shaking rod is connected with the sleeve spring. When the cylinder piston rod acts on the shaking rod, the shaking rod shakes to separate and shakes a plurality of filter cloth rods 27 of the filter plates to remove the filter cakes.

Figure 4:
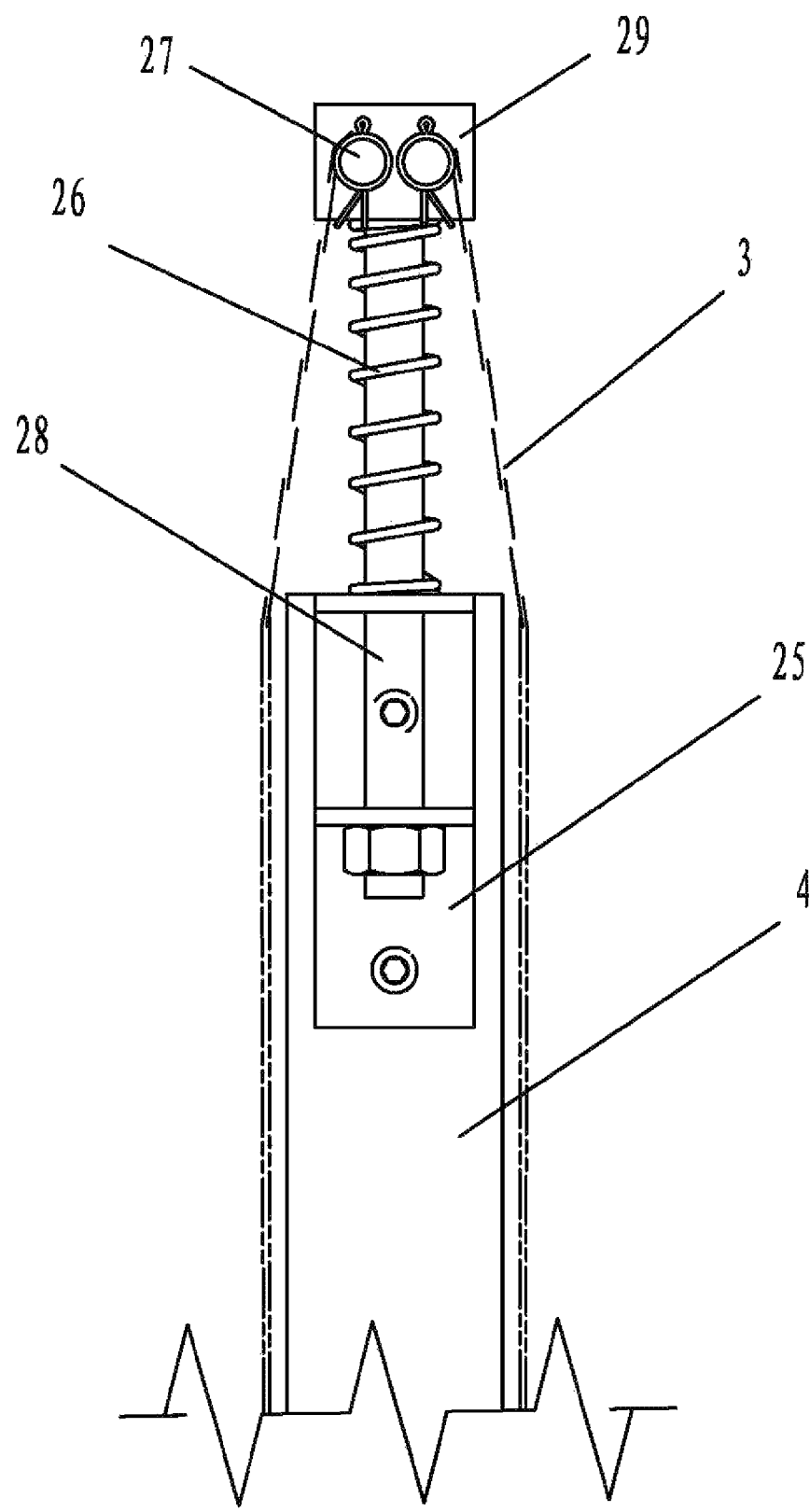
FIG. 4 is an installation diagram of a filter cloth and a filter plate in accordance with one embodiment of the invention.
Figure 5:
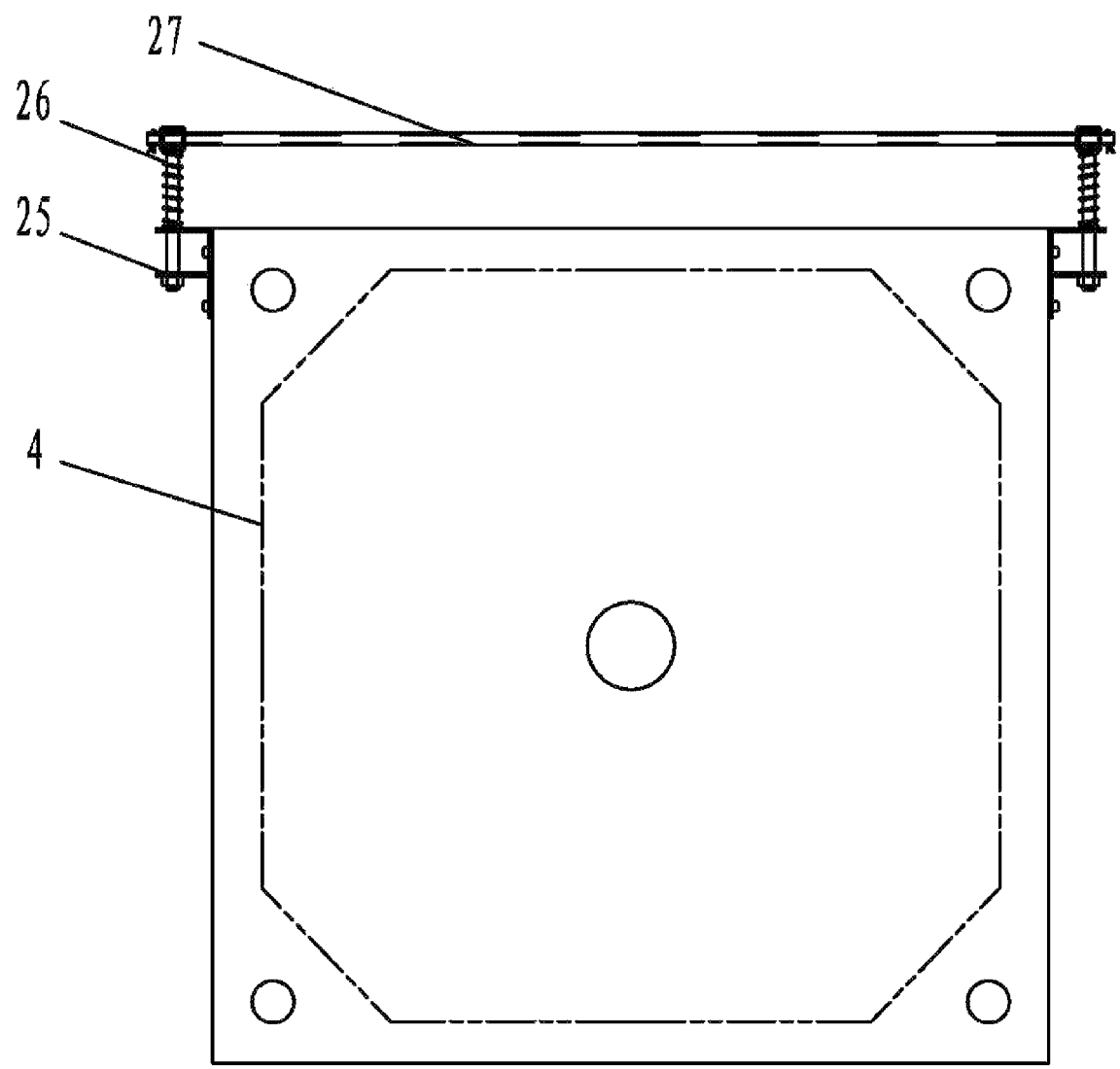
FIG. 5 is an enlarged side view of a filter cloth and a filter plate in accordance with one embodiment of the invention.

As shown in FIGS. 4 and 5, the filter plate 4 is disposed on the main beam of the filter press. A spring support 25 of the filter cloth is disposed at both sides of the upper end of the filter plate 4. The central portion of a spring shaft 28 of the filter cloth is disposed with a filter cloth spring 26 attached to the spring support 25 of the filter cloth. The lower end of the spring shaft 28 of the filter cloth is disposed with a screw thread and a nut to attach to the spring support 25 of the filter cloth. The upper end of the spring shaft 28 is disposed with a square cover 29 of the filter cloth rods having two holes. The filter cloth rods 27 are disposed in the holes of the square cover 29 with two ends fixed by circlips. The filter cloth 3 is fixed on the filter cloth rods 27 in a shape of a sleeve. The central feed port of the filter cloth 3 is fastened in the feed port of the filter plate 4 by filter cloth clamps.

The shaking device for filter plates of a filter press provided by the invention is disposed on the upper end of the filter press and the shaking device is controlled by a PLC program.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A shaking device for filter plates of a filter press, comprising:
    a) a fixed support;
    b) a movable frame;
    c) a sleeve spring device; and
    d) a shaking rod;
   wherein
    the fixed support comprises a main beam and a support crossbeam;
    the movable frame comprises a frame crossbeam and a vertical beam;
    the movable frame is disposed on the support crossbeam;

one end of the sleeve spring device is attached to the frame crossbeam and the other end is attached to the shaking rod;

the movable frame is driven by a gear motor comprising a gear box, and the gear box of the gear motor is disposed with a symmetrical drive shaft;

a limiting device is disposed on the movable frame to control the movement thereof;

one side of the main beam is provided with a chain stand, on which a chain is disposed;

on the chain is disposed with a main air pipe, and one end of the main air pipe is connected with an air supply joint and the other end is connected with an air diverting valve;

the air diverting valve is connected with a cylinder assembly and a three-way air connector in turn via an air subpipe;

the cylinder assembly is coaxially connected with the sleeve spring device and the shaking rod in a straight line; and the fixed support is disposed on the upper end of the filter press via support legs, and a front support leg is attached to a thrust plate of the filter press and a rear support leg is attached to an oil cylinder seat.

2. The shaking device of claim 1, wherein one end of the drive shaft is disposed with a pulley and a gear for the operation of the movable frame, and the gear fits with a gear rack that is located on the upper end surface of the main beam.

3. The shaking device of claim 1, wherein the sleeve spring device comprises a sleeve body, a sleeve spring, and a sleeve shaft;

the lower end of the sleeve body is fixed with a sleeve base plate and the sleeve base plate is fixedly connected with the shaking rod;

the lower end of the sleeve shaft is disposed with a flange that is attached to the sleeve spring and the other end of the flange is attached to the shaking rod; and the upper end of the sleeve shaft is fixed on the lower base plate of a sleeve hanger plate and the sleeve hanger plate is connected with the frame crossbeam.

4. The shaking device of claim 1, wherein the cylinder assembly is disposed under the frame crossbeam.

5. The shaking device of claim 2, wherein the three-way air connector is disposed on the vertical beam of the movable frame;

the pulley is disposed on the upper end of the movable frame; and a movable wheel is disposed on the lower end of the frame crossbeam.

* * * * *